United States Patent
Richter

(10) Patent No.: US 10,799,923 B2
(45) Date of Patent: Oct. 13, 2020

(54) DEVICE AND METHOD FOR DECONTAMINATING SOIL

(71) Applicant: IRON CREEK GROUP, LLC, Bellingham, WA (US)

(72) Inventor: Roger Todd Richter, Hillsborough, OR (US)

(73) Assignee: IRON CREEK GROUP HOLDINGS, INC., Boulder, CO (US)

(*) Notice: Subject to any disclaimer, the term of this patent is extended or adjusted under 35 U.S.C. 154(b) by 23 days.

(21) Appl. No.: 16/060,126

(22) PCT Filed: Dec. 9, 2016

(86) PCT No.: PCT/US2016/065842
§ 371 (c)(1),
(2) Date: Jun. 7, 2018

(87) PCT Pub. No.: WO2017/100583
PCT Pub. Date: Jun. 15, 2017

(65) Prior Publication Data
US 2018/0326465 A1 Nov. 15, 2018

Related U.S. Application Data

(60) Provisional application No. 62/265,586, filed on Dec. 10, 2015.

(51) Int. Cl.
*B09C 1/06* (2006.01)
*F23G 7/14* (2006.01)
*B09B 3/00* (2006.01)

(52) U.S. Cl.
CPC .............. *B09C 1/06* (2013.01); *B09B 3/0083* (2013.01); *F23G 7/14* (2013.01); *F23G 2209/24* (2013.01)

(58) Field of Classification Search
CPC . B09C 1/06; B09B 3/0083; F23G 7/14; F23G 2209/24
(Continued)

(56) References Cited

U.S. PATENT DOCUMENTS

| 4,670,634 A | 6/1987 | Bridges et al. |
| 4,913,065 A * | 4/1990 | Hemsath .................. B09C 1/06 110/239 |

(Continued)

FOREIGN PATENT DOCUMENTS

| CA | 3007413 A1 * | 6/2017 | .......... B09B 3/0083 |
| WO | WO-03066249 A3 * | 8/2004 | ............... B09C 1/06 |

(Continued)

OTHER PUBLICATIONS

Author unknown; European Search Report of EP16873922.5; dated Jun. 14, 2019; 7 pgs.

(Continued)

*Primary Examiner* — Stephen M Gravini
(74) *Attorney, Agent, or Firm* — K&L Gates LLP

(57) ABSTRACT

A thermal desorption system for remediating contaminated material in a zero oxygen environment by heating a gas and flowing the heated gas through a core heating conduit traversing the interior of a material compartment of a bin filled with contaminated material, redirecting the flow of heated gas from the core heating conduit to a space between the exterior of the bin and the interior of a bin housing insulator encapsulating the bin to provide dual indirect heating to the contaminated material within the bin, directing off gases of contaminated vapors released by desorption from the material to an exhaust header through a plurality of vapor outlets, and condensing the offgas in the exhaust header.

24 Claims, 6 Drawing Sheets

(58) Field of Classification Search
USPC .......................................................... 34/469
See application file for complete search history.

(56) References Cited

U.S. PATENT DOCUMENTS

| | | | | |
|---|---|---|---|---|
| 5,466,418 | A * | 11/1995 | Swanson | B09C 1/06 405/128.85 |
| 5,639,936 | A * | 6/1997 | Corte | B09C 1/06 204/157.15 |
| 5,675,909 | A * | 10/1997 | Pare | B01D 1/0017 34/265 |
| 5,904,904 | A * | 5/1999 | Swanson | B09C 1/06 422/182 |
| 6,146,596 | A | 11/2000 | Hill et al. | |
| 6,296,815 | B1 | 10/2001 | Walker et al. | |
| 6,829,844 | B2 * | 12/2004 | Brady | B09C 1/06 34/235 |
| 6,867,393 | B1 | 3/2005 | Lewis | |
| 7,513,061 | B2 * | 4/2009 | Hirayama | C02F 11/12 110/244 |
| 8,348,551 | B2 * | 1/2013 | Baker | B09C 1/08 405/128.85 |
| 8,851,066 | B1 * | 10/2014 | Kapteyn | F28D 20/0034 126/620 |
| 9,341,410 | B1 * | 5/2016 | Griffin | F26B 17/00 |
| 9,534,840 | B2 * | 1/2017 | Pahwa | F26B 21/083 |
| 9,636,723 | B2 * | 5/2017 | Brady | B09C 1/06 |
| 9,671,166 | B2 * | 6/2017 | Plavnik | F26B 7/00 |
| 10,094,616 | B2 * | 10/2018 | Carin | F26B 19/005 |
| 2002/0003988 | A1 | 1/2002 | Mikus et al. | |
| 2003/0147697 | A1 * | 8/2003 | Brady | B09C 1/06 405/128.15 |
| 2004/0159004 | A1 | 8/2004 | Brady et al. | |
| 2008/0069640 | A1 | 3/2008 | Haemers et al. | |
| 2010/0263751 | A1 | 10/2010 | Ringuette | |
| 2015/0078830 | A1 | 3/2015 | Brady | |
| 2018/0326465 | A1 * | 11/2018 | Richter | B09B 3/0083 |

FOREIGN PATENT DOCUMENTS

WO 2004101186 11/2004
WO WO-2017100583 A1 * 6/2017 ........... B09B 3/0083

OTHER PUBLICATIONS

Author unknown; International Search Report and Written Opinion of PCT/US16/65842; dated Feb. 17, 2017; 9 pgs.

* cited by examiner

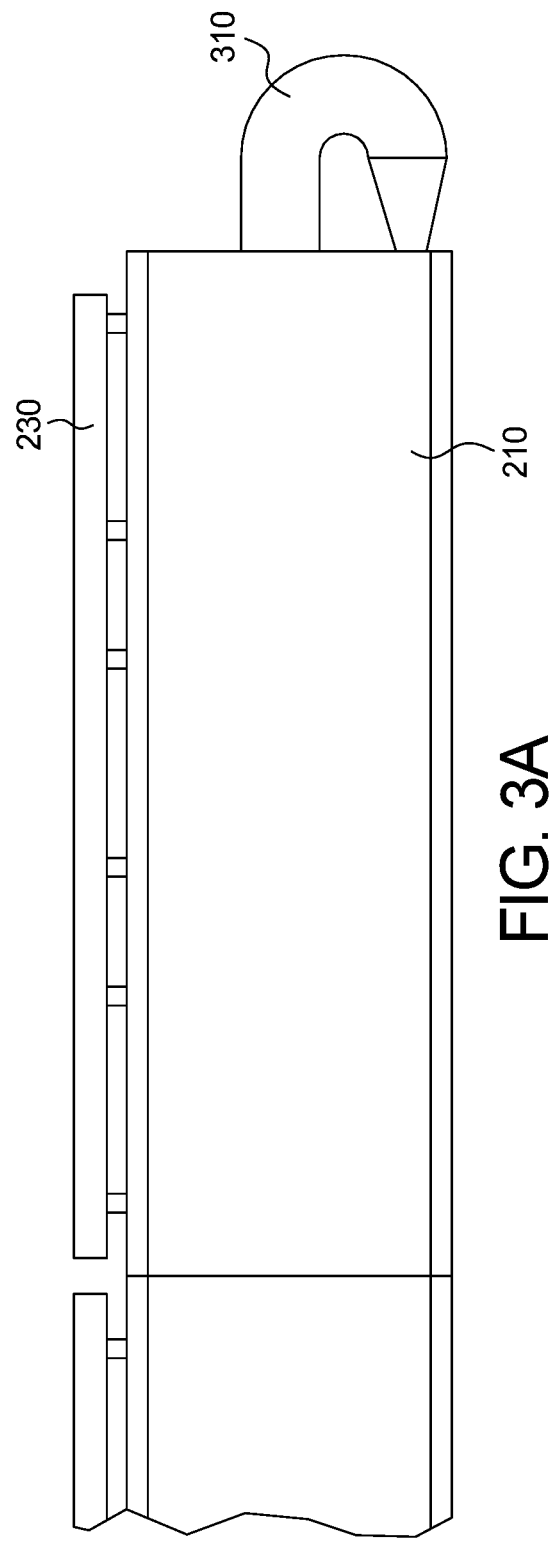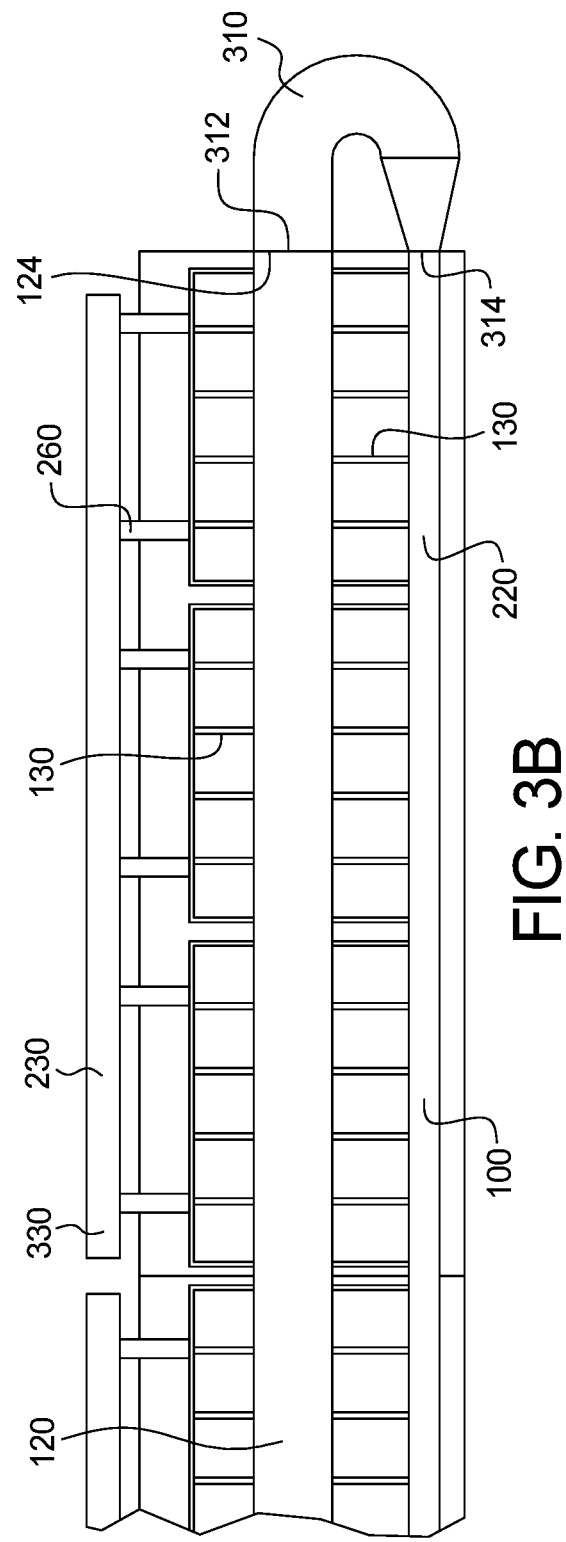

DEVICE AND METHOD FOR DECONTAMINATING SOIL

BACKGROUND OF THE INVENTION

Industrial processes commonly contaminate material, such as soil, proximate to the location of the process or produce contaminated material as a function of the process itself, such as drilling mud. These contaminated materials pose environmental risks. Remediation systems to clean contaminated material rely on inefficient processes. Further, material properties of the underlying material may be altered during a remediation process, precluding restoration applications. The size of remediation systems involved limit deployment options and can require transporting the material to another location, adding further costs and limiting recapture options of the contaminated material. Licenses and permits to operate current remediation systems, especially those that operate at high temperatures, may further preclude decontamination options at given locations.

SUMMARY

Devices, systems, and methods to provide remediation of contaminant in a material by desorption at lower temperatures and in a low oxygen or oxygen free environment are described. Some embodiments relate to technologies that indirectly heat contaminated material. Though described for purposes of indirectly heating contaminated material, one of skill in the art will appreciate other uses for technologies described within this disclosure, such as drying wet materials like mud or industrial byproducts, or other desired processes for treating material through indirect heating.

Current remediation systems expend large amounts of energy to achieve and sustain desorption temperatures and durations due to inefficient processes; current systems typically operate at roughly 30% efficiency. Current systems force heated air into a contaminated material directly to induce desorption, resulting in a large loss of heated air exhausted to the atmosphere and increasing the volatility of contaminated vapors released by desorption. This volatility is a function of the interaction of the oxygen in the injected heated air chemically reacting with the contaminated vapor.

Some embodiments of the present disclosure indirectly heat contaminated materials that are stored in a reduced-oxygen or oxygen-free environment to reduce volatilization of the contaminated vapor. Additionally, by indirectly heating the contaminated material, the control of the flow of heat applied to the contaminated material is improved and loss of heating air or other heating gas is reduced. These embodiments can operate at lower temperatures than conventional remediation or desorption systems as the efficiency savings and control of the flow of the heating agent enables longer durations of remediation without increasing the energy expended. A benefit of lower operating temperatures is easier permit or license acquisition to establish a remediation site, thereby greatly increasing the available locations for conducting remediation of contaminated material.

In some embodiments, remediation occurs by indirectly heating a contaminated material in two ways. First, a contaminated material is indirectly heated by conduction from a core heating conduit traversing the interior of a bin filled with contaminated material. Heated gas flows through the core heating conduit, providing heat to the contaminated material within the bin. The bin and core heating conduit are sealed from one another, preventing the heated gas flowing through the core heating conduit from directly contacting and interacting with the contaminated material. Second, the exhaust of the heated gas flowing through a core heating conduit is redirected to a space within a bin housing insulator that encapsulates the bin to further indirectly heat the contaminated material. The bin housing insulator encapsulates the bin filled with contaminated material and comprises a space between the interior of the bin housing insulator and exterior of the bin to receive the redirected heated gas exhausted from the core heating conduit traversing the interior of the bin.

This dual heating system indirectly heats the contaminated material by providing inside-out heating from the core heating conduit and outside-in heating from the space within the bin housing insulator. Energy efficiency by preserving heat from the heated gas rather than directly injecting into the contaminated material and releasing into the atmosphere, as currently available systems typically do, results in thermal efficiency in embodiments of the present disclosure to ranges between 70% and 90%, as compared to 30% of currently available systems as described above. Additionally, injecting heated gas directly into contaminated material quickly dissipates the heat of the gas and precludes secondary use of the gas as a heating agent, requiring a constant stream of heated gas through a contaminated material to maintain appropriate temperatures. Some embodiments avoid this dissipation of heat and correspondingly improve the efficiency of the system.

In some embodiments, offgas, such as contaminated vapors, released by desorption from the heated contaminated material can exit the bin through vapor outlets within the bin coupled to extensions for transporting the offgas from the interior of the bin to an exterior collection point. In some embodiments, the vapor outlets include perforations to enable migration of the offgas into the vapor outlets without physically disturbing the contaminated material to expose and release the offgas. By removing a need to physically manipulate the contaminated material, such as by an auger or rotation of the bin as performed in current systems, additional energy savings are achieved. Further, with fewer mechanical parts, embodiments of the present disclosure require less maintenance and are safer to operate by technicians. An additional benefit of fewer mechanical parts is the lack of prescreening materials for remediation. Current systems require rocks or other debris to be removed from the contaminated material prior to remediation to reduce interference with the mechanical operations within the desorption system. The desorption by dual indirect heating of a bin with vapor outlets rather than mechanical manipulation tools precludes the need for prescreening contaminated material, enabling faster deployment and reduced preparation time to being decontaminating a material.

In some embodiments, offgas from the vapor outlets through extensions are collected in an exhaust header. In some embodiments, the exhaust header is external to the desorption system and is separated from the heating process, such that when offgas is collected in the exhaust header it may condense for recovery. As the desorption occurs in a low oxygen or oxygen free environment, the offgas is not oxidized and any condensed contaminant making up the offgas is more easily recovered.

Some embodiments may be modular, to permit remediation in batches scaled to be project-specific size. For example, the size of a bin, core heating conduit, and bin housing insulator may be adjusted larger or smaller to fit the project need; similarly, instead of increasing the size of a single component, some embodiments couple a plurality of components together such as by serially or linearly linking several bins, bin housing insulators, and core heating conduits together. Modular design and deployment allows for "portable" remediation devices relative to currently available systems, and increases the number of sites that may be established as a remediation site. Modular/portable remediation systems further reduce logistical costs of remediation otherwise incurred by moving large volumes of contaminated material to a remediation site, as compared to moving a modular/portable remediation system to a contaminated site.

These and other embodiments of the disclosure along with many of its advantages and features are described in more detail in conjunction with the text below and attached figures.

BRIEF DESCRIPTION OF THE DRAWINGS

The foregoing aspects and many of the attendant advantages of this disclosure and its embodiments will become more readily apparent when the accompanying detailed description is taken in conjunction with the following figures.

FIGS. 3A-B illustrate a side view of a bin housing insulator with an exhaust header for receiving offgas from a number of vapor outlets of a bin encapsulated within the bin housing insulator, and a redirection port to direct a flow of heated gas from an outlet port of a core heating conduit of a bin to a space between the exterior surface of a bin and interior surface of a bin housing insulator according to some embodiments.

FIG. 6A is a top view of the bin, FIG. 6B is a front view of FIG. 6A, and FIG. 6C is a rear view of FIG. 6A.

DETAILED DESCRIPTION

Figure 1:
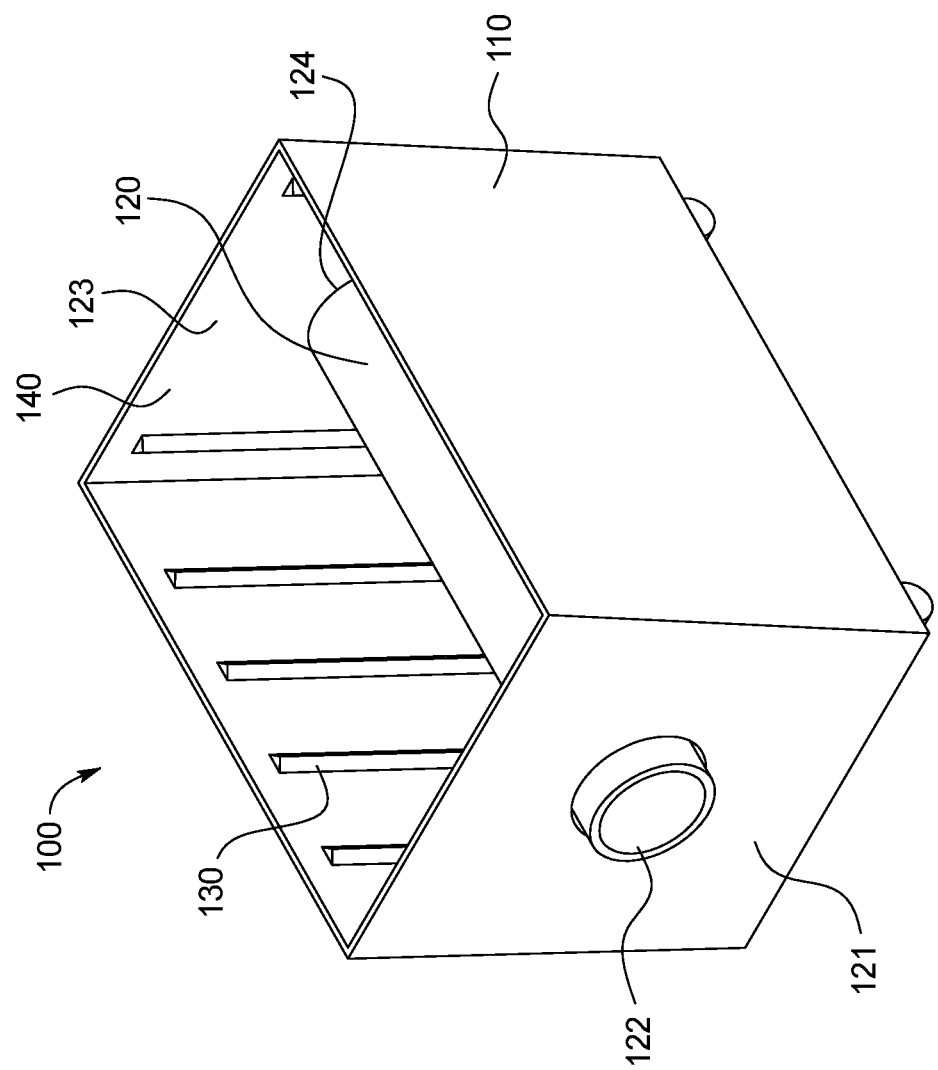
FIG. 1 illustrates a bin with a material compartment and a core heating conduit having an intake port on a first side and an outlet port on a second side and a plurality of vapor outlets according to some embodiments.

This disclosure relates to technologies to indirectly heat a material. In some embodiments, the material comprises at least one contaminant. A non-exhaustive list of contaminants that are commonly found in contaminated materials include hydrocarbons, agricultural waste, fertilizers, pesticides, chlorinated solvents, or other manufactured gas plant waste. Some embodiments are further directed to thermally induce physical separation of a contaminant within a contaminated material through desorption induced by dual indirect heating. In some embodiments, an exhaust header recaptures contaminant released as offgas from the material by condensing the offgas in the exhaust header.

One embodiment of the present disclosure is a thermal desorption device. In some embodiments, a bin housing insulator encloses or encapsulates bins filled with contaminated material. The bin housing insulator further comprises a gas delivery port to provide a flow of heated gas through the desorption device. In some embodiments, a heat source is coupled to the gas delivery port to deliver a heated gas to the desorption device through the gas delivery port.

In some embodiments, a flow of heated gas is directed from the gas delivery port to the interior of the bin housing insulator and through a bin encapsulated by the bin housing insulator. A bin has an exterior surface offset from the interior surface of the bin housing insulator such that a space is created between the bin and the bin housing insulator.

In some embodiments, a bin comprises a material compartment for filling with a contaminated material. In some embodiments, the material compartment has a first side and a second side. The first side is characterized by an intake port for a core heating conduit traversing the interior of the material compartment; the second side is characterized by an outlet port for a core heating conduit traversing the interior of the material compartment.

In some embodiments, the flow of heated gas initially moves through a core heating conduit traversing the interior of the material compartment of a bin. In some embodiments, the core heating conduit is a structure with a self-contained atmosphere with only the heated gas within and no release of heated gas into the material compartment of the bin despite the conduction of heat from the heated gas into the material compartment. In some embodiments, the core heating conduit is perforated to allow heated gas to enter the bin and material compartment.

In some embodiments, a heating source is positioned on a single end of the desorption device and coupled to a gas delivery port to deliver heated gas to an intake port of a core heating conduit from that end. In these embodiments, as the gas within the core heating conduit nearer the heating source increases in temperature, the core heating conduit itself correspondingly increases in temperature from that end. As the temperature of the core heating conduit near the heating source increases, the core heating conduit's ability to absorb additional heat from that end decreases and portions of the core heating conduit further from the heating source begin to increase in temperature. In these embodiments, the temperature gradient of the core heating conduit along the length gradually balances to a constant as the heat source continues to provide heated gas through the core heating conduit. In some embodiments, the heating source runs the length of the core heating conduit to provide a constant temperature gradient of the core heating conduit throughout heating. In some embodiments, the heated gas is delivered to the core heating conduit at velocities of two thousand actual cubic feet per minute (ACFM). In some embodiments, the heated gas is delivered at a velocity between five and ten thousand ACFM. Such high velocity ACFM quickly balances the temperature gradient in the core heating conduit to provide even temperature gradients to material compartments throughout the desorption device.

In some embodiments, the gas heated and flowing through the core heating conduit is air. The heating source employed may be a furnace or gas-fired burner burning a hydrocarbon based fuel, such as propane or natural gas or diesel fuel. In some embodiments, the heating source is an infrared heat source. One of skill in the art can appreciate other heating means and fuel sources and type of gas flowing through the core heating conduit.

In some embodiments, the gas delivery port receives gas that has been indirectly heated by heated gas already present in the bin housing insulator, thereby requiring less "combustion gas" to enter the system initially to heat material within a material compartment of a bin. By reducing the amount of gas, such as air, that must be initially heated before entering the system, indirect heating can reduce the amount of oxygen present in the system over a remediation session.

In some embodiments, one core heating conduit traverses the interior of a material compartment; in some embodiments a plurality of core heating conduits traverse the material compartment. As temperature of the gas flowing through the core heating conduit increases from the heating source, the material within the bin's material compartment is indirectly heated by conduction from the one or more core heating conduits.

In some embodiments, the core heating conduit is formed from negative space construction of the bin, such that no additional components are needed to form the core heating conduit. In some embodiments, the core heating conduit is a variable length pipe configured to pass through at least one aperture in the walls of a bin. In some embodiments, the bin and core heating conduit are constructed from stainless steel to minimize corrosion due to exposure to heat and any contaminant within the material filling the bin's material compartment. Stainless steel construction material further minimizes corrosion from external elements like rain, reducing rust exposure to the desorption device overall. In some embodiments, the bin is constructed from concrete. One of skill in the art can envision many suitable construction materials for the bin as it relates to the size of the bin and desired material remediation or treatment.

In some embodiments, the thickness of the bin construction material, whether the negative space forming the core heating conduit or the walls of the bin, are 3/16 of an inch thick to facilitate transfer of heat from the core heating conduit and space between the bin and bin housing insulator. In some embodiments, the interior of the bin is lined with a mineral fiber to further increase heat retention within the bin. In some embodiments, the bin construction material is perforated to allow passage of gas within the bin into space between the bin and the bin housing insulator. For example, in some embodiments with both a perforated core heating conduit and perforated bin construction material, heated gas and offgas released during contamination can migrate through the perforations of the core heating conduit and bin, and into the bin housing insulator.

In some embodiments, at least one vapor outlet is coupled to the interior of a bin. In some embodiments, a plurality of extensions extend from a bin to an exterior point, such as an exhaust header. Vapor outlets provide space within the bin's material compartment to receive offgases produced by desorption incident to heating the material within the bin. In some embodiments, the vapor outlets are angled metal attached to an interior surface of a material compartment to create the space to receive offgases from desorption of the material. In some embodiments, portions of the vapor outlets are perforated. Perforations in the vapor outlets enable offgases to migrate through the perforations even though the offgas is not near the top surface of the material being treated. In other words, the weight of the material being treated may preclude migration of offgas released at the bottom of the material compartment but the presence of a vapor outlet provides a means for offgas at all depths of the material being treated to escape to the top of the bin. As offgas collects at the top of the bin, in some embodiments it is transporting through one or more extensions to an exterior collection point, such as an exhaust header. The presence of space created by the vapor outlets and perforations permitting migration of offgases precludes the requirement to physically shift the material within the material compartment to expose and release any offgases. Vapor outlets thus permit separation of the material and any contaminated vapor, in the form of offgas, released by desorption without additional mechanical components and permit fewer moving parts within or external to the material compartment.

Vapor outlets further enable transport of offgas released by desorption of contaminated material stored in deep bins without rearranging the contaminated material. In other words, offgases released by material deep within a bin escape the bin through a vapor outlet extending deep into the bin through a top surface of the material filling the bin without requiring shifting the material by use of an auger or other helical rotation tool or spinning the bin to release the offgas. Energy efficiency of the desorption device is therefore improved by the vapor outlets by reducing the need for additional mechanical means to expose and release offgases for transport out of the bin. Additionally, with fewer mechanical elements coupled to a bin, the material filling a bin need not be prescreened to remove debris that may interfere with these mechanical operations.

In some embodiments, extensions from the interior of a bin to the exterior of both the bin and a bin housing insulator encapsulating the bin terminate in an exhaust header and carry provide a means for offgas to travel from a bin to an exterior collection point. In some embodiments, the exhaust header receives and collects offgases produced by desorption from heating the material received from an extension. In some embodiments, the exhaust header is air cooled by the ambient atmosphere to condense the offgas and permit collection. For example, hydrocarbon vapor, such as oil, condenses in the exhaust header and is recovered for future use or refining. In some embodiments, the exhaust header is water cooled to increase the rate of condensation. One of skill in the art can envision additional cooling procedures for the exhaust header or subsequent procedures for using the collected contaminant. For example, in one embodiment non-condensable offgas is fed from the exhaust header through a manifold to the heating source to provide an additional fuel source to the heating source and create additional energy efficiency of the desorption device. In some embodiments, the exhaust header is angled such that condensed offgas pools at a lower end, and gravity phase separation layers the condensed offgas for recovery of individual contaminants within the condensed offgas.

In some embodiments, the flow of heated gas from the core heating conduit is redirected by a redirection port coupled to an outlet port of the core heating conduit. In some embodiments, the flow of heated gas is redirected from the outlet port to the space between the exterior of a bin and the interior of a bin housing insulator. The redirected heated gas collects in the space and provides a secondary heat source to indirectly heat the material within the bin by conduction.

In some embodiments, the flow of heated gas through the core heating conduit and through the redirection port into the space between the bin and bin housing insulator all occurs in a closed system such that the heated gas is not exhausted from the bin housing insulator. In such an embodiment, the increasing pressure from the collected heated gas in the space between the bin housing insulator and bin generates additional heat to the bin filled with contaminated material. In some embodiments, the bin housing insulator comprises a pressure valve to release built-up heated gas and maintain a prescribed pressure in the space between the bin and the bin housing insulator. In some embodiments, the bin housing insulator includes an exhaust aperture proximate to the heat source. In such an embodiment, heated gas flows away from the heat source through a core heating conduit to a redirection port, where it reverses direction and flows through the space between the bin housing insulator and bin towards the heat source where it is released into the atmosphere directly through the exhaust aperture.

Redirecting heated gas from a core heating path traversing the interior of a bin's material compartment to a space between the bin and a bin housing insulator provides a dual indirect conduction environment for material within the bin's material compartment. In other words, the material is heated from the inside-out by the indirect heat of the gas flowing through the core heating conduit, and then is additionally heated from the outside-in by the indirect heat of the gas flowing through, or built-up in, the space between the bin and the bin housing insulator. This dual heating environment increases the efficiency of the heating process by exposing the material to heat transfer from the heated gas for an extended period without increasing the BTU properties of the gas or prematurely releasing the heated gas to the outside environment.

In some embodiments, the exterior surface of the bin housing insulator is lined with an insulating material. In some embodiments, the insulating material lining a bin housing insulator is intermittently applied such that portions of the bin housing insulator's exterior is not lined with insulating material. In these embodiments, the surface temperature difference of the bin housing insulator relative between insulated and non-insulated portions creates at least one condensation point within the bin housing insulator. For example, rather than collect the offgas in an exhaust header, in some embodiments (such as those with a perforated core heating conduit and bin construction material), the offgas may condense within the bin housing insulator at predetermined locations by the gaps in insulating material lining the bin housing material. In some embodiments, the insulating material gap may be proximate to a heat source or gas delivery port to induce condensation of offgas at that location for ease of injection into the heating source for additional fuel such as through a manifold. In some embodiments, the insulating material gap is proximate to an offgas collection point to recover condensed offgas.

In some embodiments, before the heated gas is released from the bin housing insulator, it is directed through a heat exchanger proximate to the heat source to increase the initial temperature of the gas entering the system and indirectly heat the gas entering the core heating conduit, thereby reducing the amount of energy required by the heating source to provide heated gas at a desired temperature through the core heating conduit.

In some embodiments, a series of ducts are positioned on the exterior of the bin housing insulator. The ducts are open at both ends to the interior of the bin housing insulator, such that the ducts are u-shaped and heated gas in the space between the exterior surface of a bin and bin housing insulator fill the duct. In some embodiments, these ducts serve as a heat exchanger to indirectly heat the fuel for a heat source or gas delivery port before entering a core heating conduit.

In some embodiments, the indirect heating of gas before entering the core heating conduit reduces the amount of combustion the heat source must apply and reduces introduction of additional oxygen into the device as the remediation process continues. As the rate of oxygen introduced decreases, the risk of oxidation of contaminant decreases. With the reduced risk of oxidation, migration of heated gas through a core heating conduit into a material compartment and migration of heated gas and offgas into the space between a bin and bin housing insulator is more permissible.

In some embodiments, both the bin and the bin housing insulator are cubical in design and comprise an open surface on at least one face of the cube. The open face facilitates filling a bin with material comprising at least one contaminant or loading a filled bin into a bin housing insulator prior to heating. In some embodiments, a common cover or lid is placed over both the bin and bin housing insulator to create a sealed environment to both the encapsulated bin and bin housing insulator. In some embodiments, a first cover is sealed over a bin prior to loading into the bin housing insulator and a second cover is sealed over the bin housing insulator encapsulating the sealed bin. In some embodiments, the cover, or first cover and second cover, is coupled to the respective bin or bin housing insulator by a vertical slot to enable vertical movement of the cover sufficient to load and unload a bin within a bin housing insulator. A cover to a bin prevents offgas from material within the bin's material compartment from pooling in the space between the bin and bin housing insulator. Similarly, a cover to the bin housing insulator maintains the closed systems and prevents the release of heated air into the atmosphere before it can provide secondary indirect heating to a bin.

In some embodiments, the extensions from within a bin's material compartment to transport offgas to the exterior of a bin pass through apertures in a bin cover. In some embodiments, the aperture of a bin cover is equal dimension to an extension vapor outlet such that a seal exists between the extension and bin cover aperture receiving the extension, and offgas does not escape between the extension and bin cover. In some embodiments, the bin cover itself comprises extensions into the interior of the material compartment. In some embodiments, portions of an extension that are external to a bin but still internal to a bin housing insulator, are not perforated such that the passage of offgas from a bin to an exhaust header or other exterior collection point is sealed. In some embodiments, portions of an extension that are external to a bin but still internal to a bin housing insulator, are perforated such that offgas may collect in the space between a bin and bin housing insulator.

In some embodiments, a gasket system coupled between a cover or first cover and a bin facilitates a seal to preclude mixing of heated gas flowing through the space between a bin and a bin housing insulator and the interior of a bin. In other embodiments, a gasket system coupled between a cover or second cover and a bin housing insulator precludes leaks of heated gas flowing between, or built-up in, the bin and bin housing insulator to the atmosphere outside the bin housing insulator. In some embodiments, a gasket system comprises a fiberglass ribbon. In some embodiments, a gasket system is a silicon sponge.

In some embodiments, the bin housing insulator is cylindrical in design. In such an embodiment, a sealed bin (sealing such as by securing a cover over the bin) is loaded into the bin housing insulator, through a loading aperture at the end of the bin housing insulator. A cover for the bin housing insulator is not needed in a cylindrical design bin housing insulator. In another embodiment, the bin is cylindrical in design rather than cubical.

In some embodiments, an end of the desorption system, such as the end opposite the heat source for embodiments with a heat source at a single end, is a loading aperture. In some embodiments, the loading aperture comprises a hinged door configured to open for loading at least one bin into the bin housing insulator and to close upon completion of loading. In some embodiments, the hinged door comprises a redirection port. In some embodiments, the redirection port is configured to align with at least one core heating conduit at a receiving end of the redirection port, and to align with the space between the bin and bin housing insulator at a redirection end. In such an embodiment, heated gas flows through a core heating conduit to the receiving end of a redirection port and then through the redirection port to the space between a bin and bin housing insulator via the redirection end of the redirection port. In some embodiments, the hinged door further comprises a gasket system, similar to the gasket described for the cover to a bin or bin housing insulator described above, to hermetically seal the bin within the bin housing insulator.

In some embodiments, an end of the desorption device is hinged and comprises an embedded heating source and gas delivery port within the hinged end to the desorption device. In some embodiments, the hinged end further comprises a redirection port for redirecting heated gas from a core heating conduit to a space between a bin and bin housing insulator. In some embodiments, both ends of the desorption device comprise hinged doors with embedded heating sources, gas delivery ports, and redirection ports such that the desorption device is indirectly heated from both ends by one or more core heating conduits.

In some embodiments, duration of remediation of the material is determined by measuring internal temperature by wire sensors or other thermocouple interior to the material compartment of a bin. The internal temperature is measured and duration determined as a function of the measured internal temperature. For example, internal temperatures below 200° F. indicate the base material has not begun desorption and further heat is required. In some embodiments, gas analyzers coupled to a vapor outlet detect the release of contaminated vapors from the material. Duration of the remediation occurs until the gas analyzer ceases to detect contaminated vapor flowing through the vapor outlet at desorption temperatures. In some embodiments, the duration of remediation is set to conform to previous successful remediation durations. For example, following a remediation treatment process, a sample of the base material is tested for presence of contaminant. Duration of remediation for similar base materials and size of bin is then adjusted for future remediation processes.

A further benefit of embodiments of the present disclosure is the modular approach of the desorption system. Multiple bins may be loaded into a common bin housing insulator; each bin aligns to create one (or more according to embodiment) common core heating conduit traversing the length of the serially connected multiple bins within the bin housing insulator. In some embodiments, a bins within the bin housing insulator have a first connection side and a second connection side. The first connection side comprises a connecting intake port for a core heating conduit traversing the interior of the additional bin, such that the connecting intake port of an additional bin aligns with the outlet port of a core heating conduit of a previous bin to create a common core heating conduit through the previous bin and additional bin. In some embodiments, the connecting intake port of a bin (such as a previous bin) aligns with a gas delivery port to receive heated gas into a core heating conduit.

In some embodiments the second connection side of a bin comprises an outlet port for the core heating conduit traversing the interior of the bin. In some embodiments, the outlet port of the bin's core heating conduit aligns with a connecting intake port of another core heating conduit of additional bins. In some embodiments, the outlet port of the core heating conduit of an additional bin aligns with a receiving end of a redirection port.

The bin housing insulator may be a single structure to house a designated number of bins, or may be modular as well according to the embodiment. The modular nature of the bin and bin housing insulator permits variable scaling or portability of the desorption device size, improving mobility aspects of the device as the desorption device can be deployed for project specific sized remediation. For example, small batches of contaminated material can be remediated by portable small bins or fewer number of bins; whereas larger batches of contaminated material can be remediated by larger bins or greater number of bins. Project specific sized system enable faster deployment and set up times to begin remediation and further enable systems to reach a greater number of sites.

Loading bins filled with material into a bin housing insulator varies according to the embodiment. In some embodiments, a rail system lines the floor of the bin housing insulator. A bin comprising wheels couples to the rail system and the bin is rolled into the bin housing insulator. For systems supporting serially connected bins, each successive bin loaded onto the rail system pushes the previously loaded bin (or bins according to embodiment) deeper into the bin housing insulator. In some embodiments, bushings between the bins prevent damage between the bins during loading. In some embodiments, a bin is wheeled but a bin housing insulator is not lined with a rail system and a bin simply rolls into the bin housing insulator.

For embodiments storing multiple serially connected bins, removal of any single bin is facilitated by a cable attachment. In some embodiments, a cable is attached to a lead bin stored in the bin housing insulator, that is, the first bin stored and coupled to the heating source for those embodiments with the heat source at a single end of the desorption system. The cable then runs through the space between the bin and bin housing insulator for the length of the bin housing insulator to a loading aperture. Removal of the serially connected bins occurs by retracting the cable attached to the lead bin; each serially connected bin is extracted from the loading aperture in turn as the cable retracts the first bin. Loading onto the rail system is enabled, in some embodiments, by a ramp configured to mechanically couple to the loading aperture. In some embodiments, a forklift lifts a bin into the bin housing insulator and onto a rail system. In some embodiments, a bin wall or bottom surface comprises a fork pocket configured to receive a forklift (such as a standard or rotating forklift) for loading a bin into and unloading a bin from a bin housing insulator.

Another embodiment of the present disclosure is a process for decontaminating or otherwise treating, such as drying, a material. In some embodiments, the material is deposited into a material compartment of a bin that further comprises a core heating conduit traversing the interior of the material compartment. The core heating conduit has an intake port on a first side of the material compartment and an outlet port on a second side of the material compartment.

In some embodiments, the intake port of the core heating conduit is coupled to a gas delivery port. In some embodiments a heating source directs heated gas into the gas delivery port and through the core heating conduit. In some embodiments, the core heating conduit is a self-contained structure within the material compartment enabling the material to heat without direct contact to the heated gas. In such an embodiment, the isolation of the flow of heated gas reduces the volatilization of any offgas from desorption of the material within the material compartment. In some embodiments, desorption occurs by thermally inducing physical separation between the material within the compartment and contaminated vapor released as an offgas. Additionally, the flow of heated gas is preserved for redirection and supplying a secondary heating source to the material within the material compartment.

In some embodiments, the bin is encapsulated within a bin housing insulator. A bin housing insulator has an interior surface offset from the exterior surface of the encapsulated bin, creating a space between the interior of the bin housing insulator and exterior of the bin. In some embodiments, the bin housing insulator has a gas delivery port to direct a flow of heated gas to a core heating conduit of a bin encapsulated within the bin housing insulator.

In some embodiments, the flow of heated gas through the core heating conduit is redirected. The outlet port of the core heating conduit connects to a redirection port and flows into the space between the bin and bin housing insulator. The flow of heated gas into the space from the core heating conduit creates dual heating to the contaminated material within the bin's material compartment. In the first instance, the material is heated from the inside by the heated gas flowing through the core heating conduit, and in the second instance from the outside by the redirected air flowing through the space between the bin and the bin housing insulator. This dual heating increases the efficiency of the desorption occurring within the compartment. Desorption further occurs, according to various embodiments, in an oxygen free environment as the material within the bin is hermetically distinct from the heated gas by gaskets or other seals to the bin and bin housing insulator. Rather than injecting heated gas into the material directly to induce desorption, which introduces contaminants into any exhaust of the heated gas and limits recapture of the heated gas or contaminated vapors, the heated gas both heats and insulates the material and the closed system reduces heat lost to the atmosphere.

In some embodiments, the decontamination process releases contaminated vapors in the form of offgas from the material within the compartment. In some embodiments, the offgas is directed to an exhaust header. In some embodiments, at least one extension from the interior of a bin directs the offgas to the exhaust header. In some embodiments, an extension is hermetically sealed, such that the environment from the bin through the extension to the exhaust header is isolated from the outside atmosphere or the space between the bin and bin housing insulator. As offgas is released from the material by desorption incident to indirectly heating the material, it may pass through perforations in vapor outlets allowing release of offgas deep within a material compartment.

In some embodiments, the offgas is collected in an exhaust header and condensed. Condensed offgas is then recovered for future uses. In some embodiments, condensation occurs by air cooling the exhaust header. In some embodiments, the exhaust header is coupled to a water cooling system to accelerate condensation of offgas collected in the exhaust header.

In some embodiments, some of the offgas released by desorption from the material is non-condensable. In some embodiments, non-condensable gas is directed, for example by a manifold, to a heating source to provide additional fuel for heating gas through the core heating conduit. In such embodiments, the thermal efficiency of the system is further increased by using non-condensable vapors recovered by desorption as an additional fuel source.

Turning now to the figures, FIG. 1 illustrates a particular embodiment of a bin 100, having an exterior surface 110 and material compartment 140 for filling with material to be treated. Material compartment 140 has a first side 121 and a second side 123. Within material compartment 140 is core heating conduit 120. The core heating conduit 120 meets the first side 121 at intake port 122. The core heating conduit 120 meets second side 123 at outlet port 124. Interior to material compartment is vapor outlet 130 with perforations (not shown) to permit migration of offgases from the material within material compartment 140 without physically shifting the material to expose the offgas for release within the material.

Figure 2:
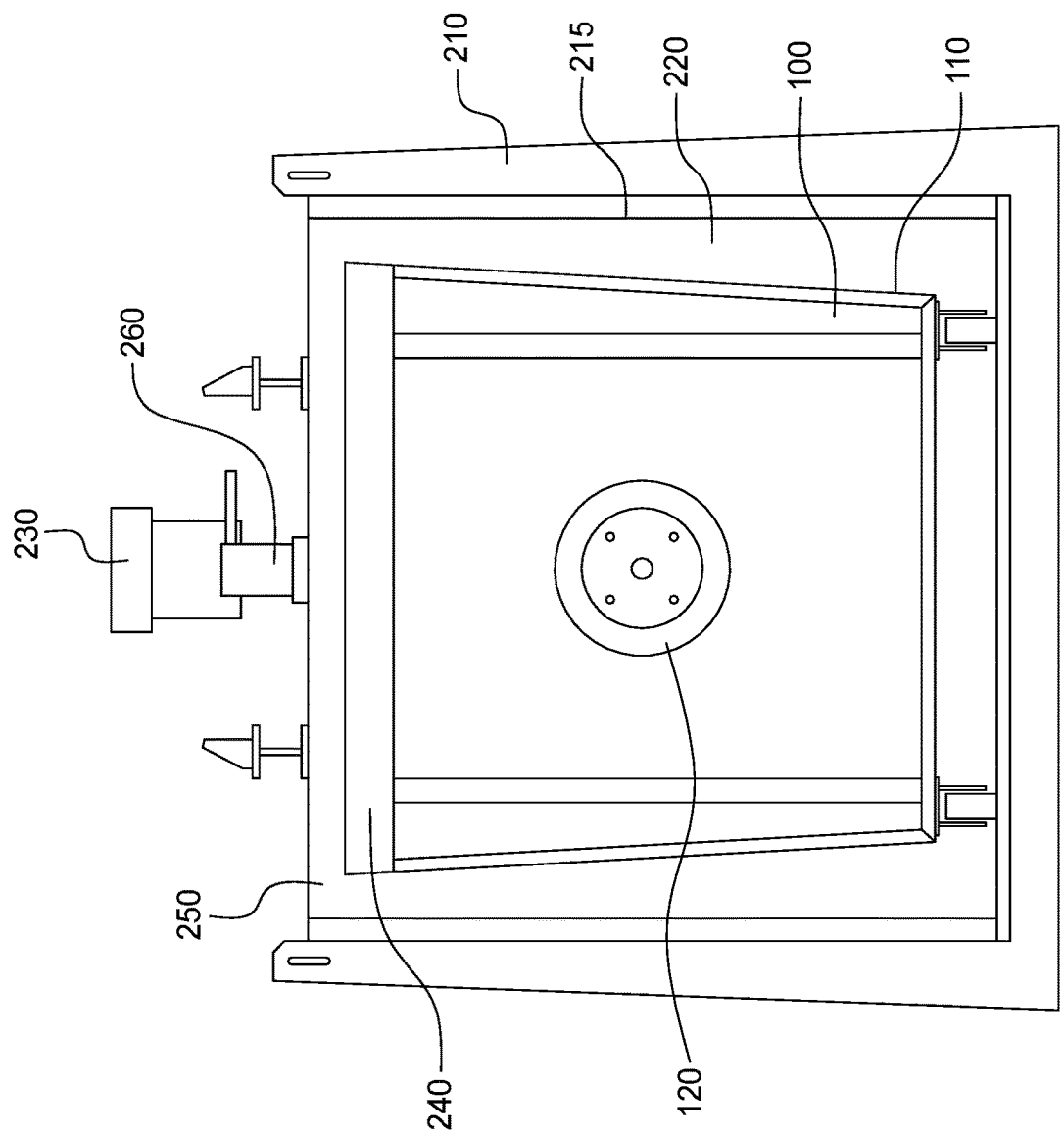
FIG. 2 illustrates a cross sectional view of a bin with a material compartment and a core heating conduit encapsulated within a bin housing insulator creating a space between the exterior surface of the bin and the interior surface of the bin housing insulator according to some embodiments.

FIG. 2 illustrates a cross sectional view of a bin 100 encapsulated by a bin housing insulator 210 according to some embodiments. Bin housing insulator has an interior surface 215 offset from the exterior surface 110 of bin 100. This offset creates a space 220 for redirected heated gas to provide a second indirect heat source to the material within bin 100 in addition to the first indirect heat source provided by core heating conduit 120. Bin housing insulator 210 further includes exhaust header 230 for receiving offgases discharged by desorption incident to heating the material within bin 100.

In some embodiments, bin cover 240 seals the material compartment 140 (as depicted in FIG. 1) of bin 100 such that any offgas released within bin 100 does not collect in space 220. In some embodiments, bin housing insulator cover 250 is a cover to bin housing insulator 210 to prevent heated gas from escaping space 220 before it can provide secondary indirect heating to bin 100. In some embodiments, bin cover 240 and bin housing insulator cover 250 are the same structure. In some embodiments, extension 260 directs a flow of offgas from the interior of bin 100 to exhaust header 230.

FIG. 3A illustrates a side view of the exterior of a bin housing insulator 210 with exhaust header 230 and redirection port 310 according to some embodiments.

FIG. 3B illustrates an interior view of a particular embodiment of bin housing insulator 210 encapsulating multiple bins 100, with exhaust header 230 and redirection port 310. Core heating conduit 120 traverses the interior of one or more bin 100 to redirection port 310. Redirection port 310 aligns with an outlet port 124 of core heating conduit 120 at receiving end 312. Redirection port 310 further aligns, at redirection end 314, with space 220 between bins 100 and bin housing insulator 210. In some embodiments, heated gas flows through core heating conduit 120 to redirection port 310 and into the space 220 to provide dual indirect heating to material within bin 100.

Further illustrated in FIG. 3B are vapor outlets 130 to receive offgases from the material during desorption and guided via extensions 260 to exhaust header 230. Exhaust header 230 is angled such that condensed offgas pools at end 330 for recovery.

Figure 4:
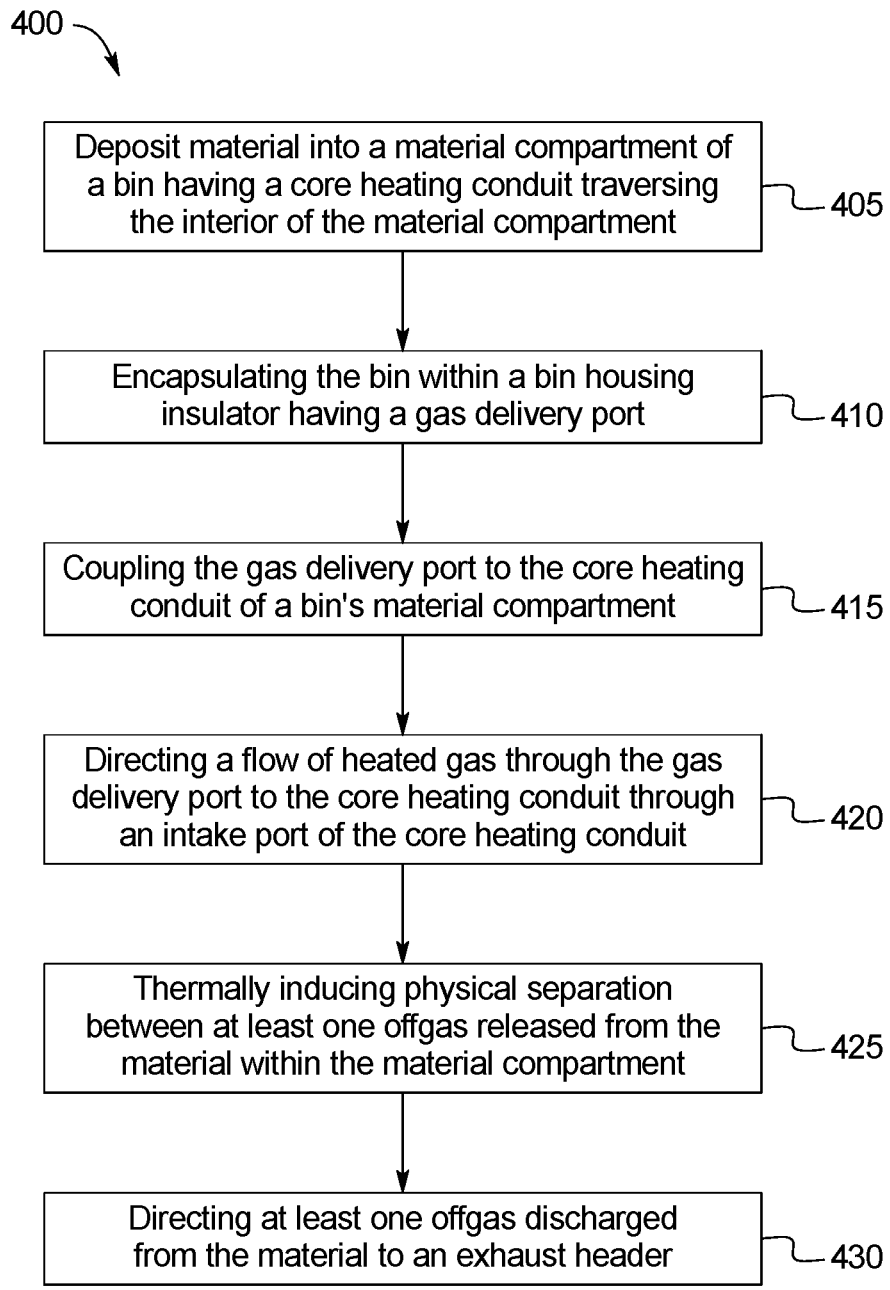
FIG. 4 illustrates processes for decontaminating a material by depositing a material into a material compartment of a bin, encapsulating the bin within a bin housing insulator, directing a flow of heated gas through the material compartment, thermally inducing physical separation between an offgas and the material within the bin, and directing the offgas to an exhaust header according to some embodiments.

FIG. 4 illustrates an embodiment of a process 400 for decontaminating material. Process 400 begins at 405 by depositing a material into a material compartment of a bin having a core heating conduit traversing the interior of the material compartment. At 410, the bin filled with material is encapsulated within a bin housing insulator having a gas delivery port. At 415, the gas delivery port of the bin housing insulator is coupled to the core heating conduit and at 420 a flow of heated gas is directed by the gas delivery port through the core heating conduit to heat the material within the material compartment. At 425, thermally induced physical separation occurs between the material and any contaminated vapors, in the form of offgas, within the material compartment. The offgas is directed at 430 from the material compartment to and collect in an exhaust header.

Figure 5:
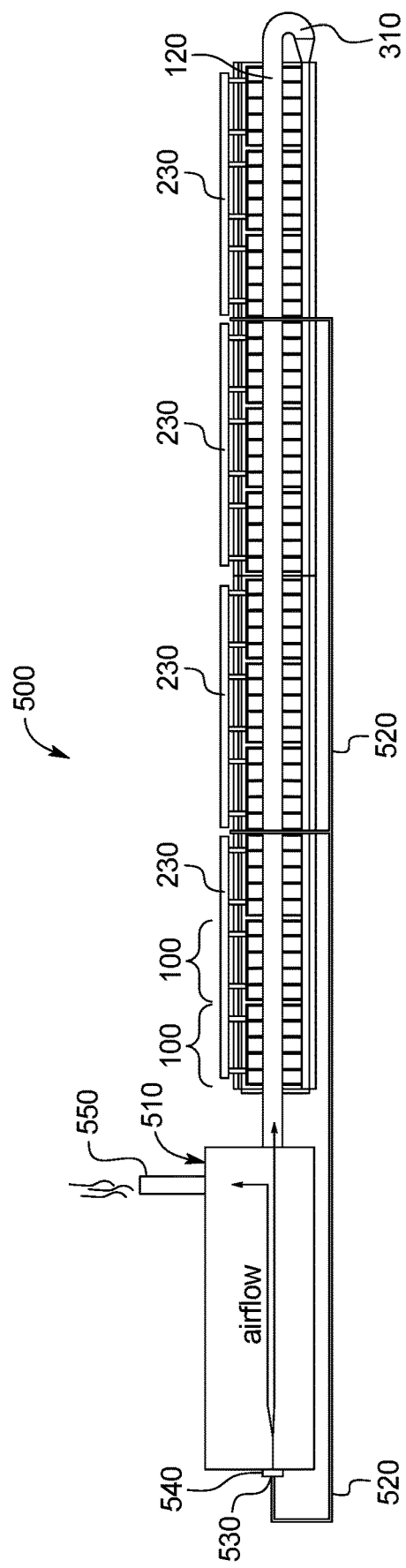
FIG. 5 illustrates a cross-sectional view of a system configured to reuse the offgas generated by bin housing insulator as the heated gas to heat the material within the material compartment of one or more bin within bin housing insulator.

FIG. 5 illustrates a cross-sectional view of an example embodiment of a treatment system 500 that places bin housing insulator 210 in communication with an offgas treatment device 510 to allow the offgas collected by exhaust header 230 to be reused as the heated gas that passes through core heating conduit 120, redirection port 310, and space 220. In the illustrated embodiment, one or more pipes 520 fluidly connect exhaust header 230 of bin housing insulator 210 with an inlet 530 of off-gas treatment device 510. Offgas drawn into exhaust header 230 during the process described above can be treated by offgas treatment device 510 and then reused as the heated gas that passes through core heating conduit 120, redirection port 310, and space 220 as described above. By reusing the offgas from exhaust header 230, the efficiency of the system shown in FIGS. 1 to 3B can be increased.

The process of using system 500 is similar to the process 400 shown in FIG. 4. With system 500, the offgas discharged from the material within material compartment 140 to exhaust head 230 is directed through one or more pipes 520 to inlet port 530 of offgas treatment device 510. Offgas treatment device 510 includes a heating mechanism 540, such as a burner described above, that can be used to heat the offgas entering inlet 530. Contaminants that are products of combustion (e.g., carbon monoxide, carbon dioxide, nitric oxide, etc.) can be removed from the offgas through an exhaust port 550, and the gas heated by heating mechanism 540 can then be directed as heated gas through core heating conduit 120 to redirection port 310 and into the space 220 to provide dual indirect heating to the material within bin 100 as described above. At space 220, the heated gas can be exhausted because it will be free of the contaminants removed by offgas treatment device 510. Offgas treatment device 510 can also include one or more filters to filter the offgas before it is provided as heated gas to core heating conduit 120.

Figure 6C:
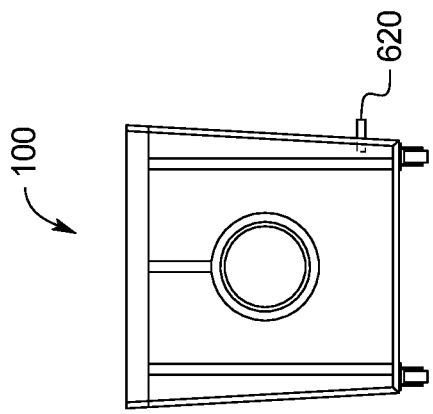
FIGS. 6A-6C illustrate an example embodiment of a bin that includes an anode and a cathode for removing salts from the material within the material compartment of one or more bin within bin housing insulator.
Figure 6B:
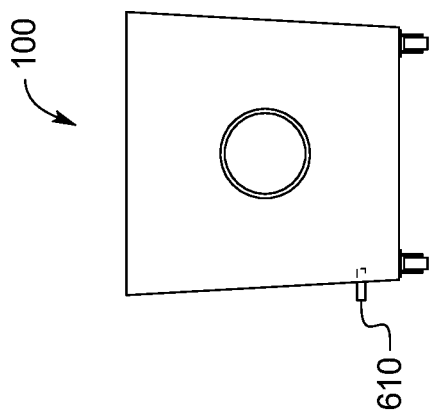
Figure 6A:
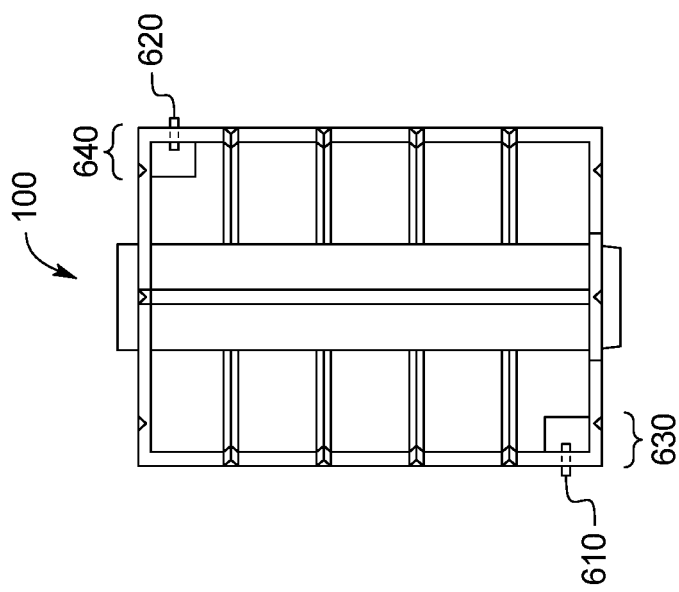

FIGS. 6A to 6C illustrate an example embodiment of a bin 100 including an anode 610 and a cathode 620 that can be used to remove salts from the material within material compartment 140 of bin 100. In the illustrated embodiment, the anode 610 and cathode 620 are located on opposite lower corners of bin 100, but those of ordinary skill in the art will recognize other configurations that can be used. Anode 610 and cathode 620 can be energized by one or more power sources (not shown). In an embodiment, anode 610 can be surrounded by an anode container 630 within bin 100, while cathode 620 can be surrounded by a cathode container 640 within bin 100. Anode container 630 and cathode container 640 can be formed so as to allow the entry of liquid, but to prevent the entry of the material located within material compartment 140 of bin 100.

In use, the material in material compartment 140 of bin 100 can be heated according to the process described above to remove offgas from the material. Bin 100 can then be flooded with water, and electricity can be supplied from the one or more power source to anode 610 and cathode 620. The positive charge of anode 610 will attract negatively charged salts from the material that have migrated into the water, while the negative charge of cathode 620 will attract positively charged salts from the material that have migrated into the water. Since anode container 630 and cathode container 640 have been formed so as to allow the entry of liquid, but to prevent the entry of the material, anode container 630 and cathode container 640 can capture the salts. The water can then be drained from bin 100, with the resulting material being substantially salt-free.

While the present disclosure has been described in terms of particular embodiments and illustrative figures, those of ordinary skill in the art will recognize that the present disclosure is not limited to the embodiments or figures described. For example, in various embodiments described above, a contaminated material within a material compartment is indirectly heated by a single source such as a core heating conduit. However, in other embodiments, the material receives dual indirect heat for inducing desorption by first heating the material by a core heating conduit and then redirecting the heated gas from the core heating conduit to a space between a bin housing insulator and a bin filled with contaminated material. In another example, in various embodiments the heated gas built up in the space between a bin and a bin housing insulator is released through a pressure valve. In other embodiments, the built up heated gas is released through an exhaust aperture and in still other embodiments the pressure valve and exhaust aperture are one and the same.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the present disclosure. In this regard, no attempt is made to show structural details of the present disclosure in more detail than is necessary for the fundamental understanding of the present disclosure, the description taken with the drawings and/or examples making apparent to those skilled in the art how the several forms of the present disclosure may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Words using the singular or plural number also include the plural and singular number, respectively. Additionally, the words "herein," "above," and "below" and words of similar import, when used in this disclosure, shall refer to this disclosure as a whole and not to any particular portions of the disclosure.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

All of the references cited herein are incorporated by reference. Aspects of the disclosure can be modified, if necessary, to employ the systems, functions, and concepts of the above references to provide yet further embodiments of the disclosure. These and other changes can be made to the disclosure in light of the detailed description.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the present disclosure can be practiced with modification and alteration within the spirit and scope of the appended claims. The description is not intended to be exhaustive or to limit the present disclosure to the precise form disclosed. It should be understood that the present disclosure can be practiced with modification and alteration and that the present disclosure be limited only by the claims and the equivalents thereof.

What is claimed is:

1. A thermal desorption device, the device comprising:
    a bin housing insulator having an interior surface and comprising a gas delivery port;
    a bin positioned within the bin housing insulator, the bin comprising:
        an exterior surface;
        a material compartment having a first side and a second side; and
        a core heating conduit coupled to the gas delivery port, the core heating conduit positioned within the material compartment and having an intake port on the first side and an outlet port on the second side;
    one or more vapor outlets, each vapor outlet coupled to the bin for receiving offgas discharged from within the material compartment;
    an extension coupled to the material compartment and configured transport offgas away from an interior of the bin;
    an exhaust header coupled to the extension, the exhaust header configured to receive the offgas from the material compartment through the extension; and
    a redirection conduit coupled to the outlet port of the core heating conduit, the redirection conduit directing heated gas from the outlet port to a space between the interior surface of the bin housing insulator and the exterior surface of the bin.

2. The device of claim 1, wherein the core heating conduit is sealed from the material compartment of the bin such that heated gas flowing through the core heating conduit does not flow into the material compartment.

3. The device of claim 1, wherein the device further comprises a first heating source configured to deliver heated gas to the gas delivery port.

4. The device of claim 3, wherein the device further comprises a heat exchanger configured to indirectly heat a gas source before receiving heat from the first heating source.

5. The device of claim 1, wherein the device further comprises a second bin coupled to the bin, the second bin comprising:
    a second material compartment having a first connection side and a second connection side; and
    a second core heating conduit.

6. The device of claim 5, wherein the second core heating conduit comprises:
    a connecting intake port on the first connection side, the connecting intake port being coupled to the outlet port of the bin; and
    a second outlet port on the second connection side.

7. The device of claim 1, wherein the bin housing insulator comprises a loading aperture and a door, the loading aperture sized to receive the bin.

8. The device of claim 1, wherein the bin housing insulator comprises a bin cover sealing at least an upper opening of the bin housing insulator.

9. The device of claim 1, wherein:
    a floor of the bin housing insulator comprises one or more rails; and
    the bin comprises a plurality of wheels, each wheel positioned on at least one rail.

10. The device of claim 3, wherein the exhaust header is coupled to the first heating source such that offgas discharged from within the material compartment is supplied to the gas delivery port.

11. The device of claim 1, which includes at least one of an anode and a cathode configured to separate salt from material within the material compartment.

12. A method for decontaminating materials, the method comprising:
    depositing a material into a material compartment of a bin having a first side, a second side, an exterior surface, and a core heating conduit within the material compartment having an intake port on the first side of the bin and an outlet port on the second side of the bin, the core heating conduit passing through the material;
    positioning the bin within a bin housing insulator having an interior surface and a gas delivery port;
    coupling the intake port of the core heating conduit to the gas delivery port of the bin housing insulator; and
    directing a flow of heated gas through the gas delivery port, the intake port, and the core heating conduit to heat the material to thermally induce physical separation between at least one offgas and the material within the material compartment.

13. The method of claim 12, further comprising directing offgas discharged from the material to an exhaust header.

14. The method of claim 13, further comprising condensing at least a portion of the offgas in the exhaust header.

15. The method of claim 14, further comprising directing a non-condensable offgas in the exhaust header to a heat source configured to heat a gas before entering the gas delivery port.

16. The method of claim 12, further comprising directing offgas discharged from the material to a space between the interior surface of the bin housing insulator and the exterior surface of the bin.

17. The method of claim 16, further comprising condensing at least a portion of the offgas in the space.

18. The method of claim 17, further comprising directing a non-condensable offgas in the space to a heat source configured to heat a gas before entering the gas delivery port.

19. The method of claim 12, further comprising redirecting the flow of heated gas from the outlet port of the core heating conduit to a space between the exterior surface of the material compartment and the interior surface of the bin housing insulator.

20. The method of claim 12, further comprising indirectly heating gas through a heat exchanger prior to the heated gas entering the gas delivery port.

21. The method of claim 12, further comprising sealing a bin housing insulator.

22. The method of claim 12, further comprising coupling the gas delivery port to a heat source configured to heat a gas.

23. The method of claim 12, which includes using offgas discharged from within the material compartment as the heated gas supplied to the gas delivery port.

24. The method of claim 12, which includes separating salt from the material within the material compartment by energizing at least one of an anode and a cathode.

\* \* \* \* \*